United States Patent Office
3,840,481
Patented Oct. 8, 1974

3,840,481
CLEANING COMPOSITION AND PREPARATION AND USE THEREOF
Russell C. Miller, Chicago, Ill., assignor to J. M. Eltzroth & Associates, Inc., Schaumburg, Ill.
No Drawing. Filed June 8, 1972, Ser. No. 260,762
Int. Cl. C11d 3/30
U.S. Cl. 252—546                                          10 Claims

ABSTRACT OF THE DISCLOSURE

Liquid compositions useful for cleaning various types of surfaces including metal, glass and plastic surfaces are prepared by reacting boric acid, an aliphatic carboxylic chelating agent and potassium hydroxide at a pH of at least 9.6 in proportions to give a homogeneous solution which is non-flocculating at 20° C. These solutions are prepared in a concentrated form and are diluted with water for cleaning purposes. They are especially useful in cleaning metals or metal alloys for the purpose of conditioning the metal or metal alloy prior to the application of various types of coatings.

BACKGROUND

Recent anti-pollution precautions in connection with the use of cleaning compositions have led to a search for cleaning compositions containing no phosphates or other substances that might cause harm to the environment. Sodium carbonate and other alkaline substances are being used in liquid alkaline cleaners. Borax ($Na_2B_4O_7 \cdot 10H_2O$) has been used as a cleaner but is not suited for use as such in cleaners sold in concentrated liquid form because of its low solubility in water at ordinary temperatures (e.g., 20° C.).

One of the problems in preparing a concentrated liquid alkaline cleaner is to provide a composition in which the active ingredients are sufficiently concentrated from the economic standpoint and remain uniformly dispersed and stabilized under various temperature conditions during storage and transportation. If flocculation occurs in the concentrated liquid alkaline cleaner or when such liquid is diluted with water to the desired operating concentration, the cleaner is not considered to be commercially satisfactory.

In order to meet commercial requirements an alkaline liquid cleaner of the type described should not only contain the active ingredients in a concentrated form and be free from flocculation in the concentrated form and when diluted with water, but should also be compatible with other additives such as surfactants, antifoaming agents, foaming agents, deoxidizing agents, solvents, specific inhibitors, additives to prevent the re-deposition of soil and hydrotopes. The cleaner must also have a high degree of performance in removing soil from various types of surfaces and in certain types of operations it must not leave a residue or inhibit the surface so as to interfere with a subsequent treatment as, for example, the application of a coating.

OBJECTS

One of the objects of the present invention is to provide a new and improved concentrated liquid alkaline cleaner which contains a sufficient concentration of active ingredients to be economically practical and which will remain uniformly dispersed and stabilized under various temperature conditions during storage and transportation.

Another object of the invention is to provide a cleaner of the type described in which one of the active ingredients is a boron compound.

Still a further object of the invention is to provide a cleaner of the type described which can be reduced or diluted with water to the desired operating concentration with a minimum of flocculation.

Another object of the invention is to provide a cleaner of the type described which can be employed in cleaning solid surfaces such as metal, plastic or glass surfaces and which is especially useful for cleaning metal, or metal alloy surfaces of iron, aluminum, zinc, copper, magnesium and/or manganese for the purpose of conditioning said metal or metal alloy surfaces prior to chromate or phosphate conversion coating, electrocoating, galvanizing or painting except in certain instances, such as in zinc phosphatizing of steel or manganese or prior to hot dip galvanizing of steel.

Another object is to provide a cleaner of the type described which is compatible with certain types of surfactants and also with other additives such as antifoaming agents, foaming agents, deoxidizing agents, solvents, specific inhibitors, preventatives for the re-deposition of soil and hydrotopes.

An additional object of the invention is to provide a new and improved process for preparing an aqueous alkaline borate solution wherein said solution contains a high concentration of dissolved solids, usually within the range of 40% to 60% by weight and remain substantially free from flocculation during shipment and storage and when reduced or diluted with water to operating concentrations usually within the range of about 1% to 5% by weight dissolved solids.

A further object of the invention is to provide a new and improved process for cleaning various types of surfaces and particularly metal and metal alloys of iron, aluminum, zinc, copper, magnesium or manganese for the purpose of conditioning such surfaces and particularly for conditioning such surfaces for subsequent treatments such as chromate or phosphate conversion coating, electrocoating, galvanizing or painting but not for zinc phosphatizing of steel. Other objects will appear hereinafter.

BRIEF SUMMARY OF THE INVENTION

According to the invention, a liquid composition is provided which is the product of the reaction in aqueous solution of boric acid, an aliphatic carboxylic chelating agent and potassium hydroxide reacted at a pH of at least 9.6 in proportions to give a homogeneous solution which is non-flocculating at 20° C. The dissolved solids content of this solution is usually within the range of 40% to 60% by weight and the pH is preferably within the range of 9.6 to 10.5. The concentration of the components is usually sufficient to generate in situ a temperature of at least 60° C.

DETAILED DESCRIPTION OF THE INVENTION

The process is preferably carried out by preparing an aqueous alkaline borate solution by mixing boric acid and an aliphatic carboxylic chelating agent with water and mixing the resultant mixture with an aqueous solution of potassium hydroxide, the amount of boric acid being sufficient to give a pH of at least approximately 9.6 and the amount of chelating agent being sufficient to inhibit flocculation of potassium hydroxide, and continuing said mixing until a homogeneous solution is obtained. In order to obtain the desired homogeneous solution free from flocculation it is essential to have a pH of at least about 9.6 because separation occurs at a pH of around 9.5. Usually the pH is within the range of 9.6 to 10.5, but it can be somewhat higher.

The molar ratio of boric acid, calculated as $B_2O_3$, to potassium hydroxide, calculated as $K_2O$, is usually within the range of 1:3 to 3:1 but preferably within the range of 1:2 to 1:1 with the optimum ratio being approximately 1:2. The quantity of chelating agent will depend upon the particular chelating agent employed but should be sufficient to inhibit precipitation or flocculation. Usually the molar ratio of carboxy in the chelating agent to $K_2O$ is within the range of 1:3 to 3:1.

On a weight basis the weight ratio of boric acid to potassium hydroxide is usually within the range of 1:9 to 3:2 and the weight ratio of chelating agent to potassium hydroxide is usually within the range of 3:10 to 1:2.

The reaction can be carried out at the moderate temperatures generated by the heat of reaction or by the heat of solution usually within the range of 60° C. to 70° C. but higher or lower temperatures can be employed.

Examples of chelating agent which can be employed are gluconic acid, tartaric acid, citric acid, oxalic acid, lactic acid, ethylenediamine tetraacetic acid, N-hydroxyethylethylenediamine triacetic acid, nitrilotriacetic acid, diethylene triamine pentaacetic acid, and their water soluble salts, especially the alkali metal salts and particularly the sodium salts.

The invention will be further illustrated but is not limited by the following examples in which the quantities are given in parts by weight unless otherwise indicated.

EXAMPLE I

A composition was prepared from the following ingredients:

| Ingredients: | Parts by weight |
|---|---|
| Boric acid | 200 |
| Tetrasodium ethylenediamine tetraacetate | 150 |
| Potassium hydroxide (45% solution in water | 1,000 |
| Sodium carbonate | 100 |
| Water | 1,400 |

The boric acid and tetrasodium ethylenediamine tetraacetate were mixed together with water and the resultant mixture was mixed with the aqueous solution of potassium hydroxide after which the sodium carbonate was added and the mixing was continued until a homogeneous solution was obtained.

In this example, the sodium carbonate is an optional ingredient which is employed in order to improve the cleaning performance. If desired, potassium carbonate can be substituted for the sodium carbonate or these ingredients can be omitted.

The resultant alkaline liquid composition has a dissolved solids content of approximately 46.5% and a specific gravity of approximately 1.32.

This composition is usually stored and shipped as such and is diluted to a concentration of 1% to 5% by weight dissolved solids with water before use. The diluted composition is used as a cleaner. It will etch aluminum but will not etch galvanized steel. It can also be used for cleaning other types of surfaces and is particularly useful for cleaning a metal or metal alloy of iron, aluminum, zinc, copper, magnesium or manganese for the purpose of conditioning such metal or metal alloy prior to chromate or phosphate conversion coating, electrocoating, galvanizing or painting. However, due to its inhibiting action, it should not be used for cleaning steel or manganese prior to zinc phosphatizing or prior to hot dip galvanizing of steel.

In order to increase rinsability or to remove oil from the surfaces to be cleaned or for special purposes, surfactants, deoxidants, descalers and solvents or hydrotopes can be added.

The following examples illustrate the ingredients in typical formulations for special purposes.

EXAMPLE II

This example illustrates a formulation for steel cleaning by immersion (with or without agitation) or by spraying.

The ingredients in this formulation are as follows:

| Ingredients: | Parts by weight |
|---|---|
| $H_3BO_3$ (technical) | 50–100 |
| Chelate | 30 |
| De-oxidant or de-scaler | 10 |
| Water | 200 |
| Potassium hydroxide (45% aqueous solution) | 200–300 |
| Surfactant | 30–60 |
| Coupling agent (if required). | |

EXAMPLE III

This example illustrates the ingredients used for preparing a formulation for electrocleaning steel.

The ingredients in this formulation are as follows:

| Ingredients: | Parts by weight |
|---|---|
| $H_3BO_3$ (technical) | 50–100 |
| Chelate | 5–10 |
| De-oxidant or de-scaler | 20–50 |
| Potassium hydroxide (45% aqueous solution) | 200–500 |
| Soda ash | 50–100 |
| Water (to clarity and required Sp.G.). | |
| Surfactant system | 5–20 |

EXAMPLE IV

This example illustrates the ingredients used for preparing a formulation for cleaning non-ferrous metals.

The ingredients in this formulation are as follows:

| Ingredients: | Parts by weight |
|---|---|
| $H_3BO_3$ (technical) | 200 |
| Chelate | 150 |
| Water | 1,000 |
| Potassium hydroxide (45% aqueous solution) | 800 |
| Soda ash | 50 |
| De-oxidant | 50 |
| Surfactant system | 20 |

In the foregoing examples the chelate is preferably tetrasodium ethylenediamine tetraacetate (EDTA) but can be, for example, acetic acid or its sodium salt, oxalic acid or its sodium salt, tartaric acid or its potassium salt, gluconic acid or its sodium salt, lactic acid or its sodium salt, trisodium(N-hydroxyethyl)ethylene diamine triacetate, disodium salt of ethylenediamine tetraacetic acid, the trisodium salt of ethylenediamine tetraacetic acid, trisodium nitrilotriacetate, or pentasodium diethylenetriamine pentaacetate.

The surfactants can be any of the nonionic, anionic or or amphoteric surfactants disclosed in McCutcheon's 1970 Annual entitled "Detergents and Emulsifiers."

Coupling agents which can be employed are xylene sulfonate and oxyethylated phenols.

Examples of de-oxidants and de-scalers which can be added are those materials which are known to be effective for this purpose, including nitrates, nitrites, sulfates, sulfites, chlorides, gluconates, citrates, oxalates, fluoborates, silicofluorides, acetates, lignin sulfonates and in some cases, phosphates.

The types of solvents or hydrotopic agents which can be employed include glycerine, water soluble alcohols, and glycols and the water soluble lower alkyl ethers of glycols such as, for example, the monoethylether of ethylene glycol, or the monoethylether of diethylene glycol.

In preparing the compositions of Examples II, III and IV, the boric acid, chelate and potassium hydroxide are reacted as described in Example I and the other ingredients are added later.

The invention provides a liquid composition in concentrated form which can be diluted with water and used as an alkaline cleaner and which resists crystal separation at temperatures as low as 4° C. The invention also provides an alkaline cleaner which satisfies anti-pollution requirements and which is compatible with various types of additives such as certain types of surfactants, many different types of de-oxidants and de-scalers, and well known readily obtainable solvents and hydrotopes. This type of cleaner is unusually versatile for cleaning all types of ferrous and non-ferrous metal surfaces and also for cleaning plastic, glass and other non-metallic surfaces.

The invention is hereby claimed as follows:

1. A product consisting essentially of the product of reaction in aqueous solution of boric acid, an aliphatic carboxylic chelating agent and potassium hydroxide reacted at a pH within the range of 9.6 to 10.5 in proportions to give a homogeneous solution which is non-flocculating at 20° C., said chelating agent being from the group consisting of gluconic acid and water soluble gluconates, tartaric acid and water soluble tartrates, citric acid and water soluble citrates, oxalic acid and water soluble oxalates, lactic acid and water soluble lactates, ethylene diamine tetraacetic acid and its water soluble salts, N-hydroxyethyl ethylene diamine triacetic acid and its water soluble salts, nitrilotriacetic acid and its water soluble salts, and diethylene triamine pentaacetic acid and its water soluble salts, the molar ratio of boric acid, calculated as $B_2O_3$, to potassium hydroxide, calculated as $K_2O$, being within the range of 1:3 to 3:1 and the quantity of said chelating agent being sufficient to inhibit precipitation, the resultant solution containing 40% to 60% by weight dissolved solids.

2. A composition as claimed in claim 1 in which the molar ratio of boric acid, calculated as $B_2O_3$, to potassium hydroxide, calculated as $K_2O$, is within the range of approximately 1:2 to 1:1 and the quantity of said chelating agent is sufficient to inhibit precipitation.

3. A composition as claimed in claim 1 in which the molar ratio of carboxy in said chelating agent to $K_2O$ is within the range of 1:3 to 3:1.

4. A composition as claimed in claim 1 in which said chelating agent is tetrasodium ethylenediamine tetraacetate.

5. A process of preparing an aqueous alkaline borate solution which comprises mixing boric acid and an aliphatic carboxylic chelating agent with water and mixing the resultant mixture with an aqueous solution of potassium hydroxide, the amount of boric acid being sufficient to give a pH within the range of 9.6 to 10.5 and the amount of chelating agent being sufficient to inhibit flocculation of potassium hydroxide, and continuing said mixing until a homogeneous solution is obtained, said chelating agent being from the group consisting of gluconic acid and water soluble gluconates, tartaric acid and water soluble tartrates, citric acid and water soluble citrates, oxalic acid and water soluble oxalates, lactic acid and water soluble lactates, ethylene diamine tetraacetic acid and its water soluble salts, N-hydroxyethyl ethylene diamine triacetic acid and its water soluble salts, nitrilotriacetic acid and its water soluble salts, and diethylene triamine pentaacetic acid and its water soluble salts, the molar ratio of boric acid, calculated as $B_2O_3$, to potassium hydroxide, calculated as $K_2O$, being within the range of 1:3 to 3:1, the resultant solution containing 40% to 60% by weight dissolved solids.

6. A process as claimed in claim 5 in which the weight ratio of boric acid to potassium hydroxide is approximately 1:9 to 3:2 and the weight ratio of said chelating agent to potassium hydroxide is within the range of 3:10 to 1:2.

7. A process as claimed in claim 5 in which the concentration of the components of said solution is sufficient to generate in situ a temperature of at least 60° C.

8. A process as claimed in claim 5 in which said chelating agent is tetrasodium ethylenediamine tetraacetate.

9. A process as claimed in claim 5 in which said chelating agent constitutes 30% to 50% by weight of said potassium hydroxide.

10. A process of cleaning surfaces which comprises preparing a solution as claimed in claim 1 as a concentrated solution containing 40% to 60% by weight dissolved solids, diluting said concentrated solution with water to a concentration of about 1% to 5% by weight dissolved solids and applying said dilute solution as a cleaner to a surface to be cleaned.

References Cited

UNITED STATES PATENTS 3,634,338   1/1972   Laugle et al. _____ 252—139

FOREIGN PATENTS 241,754   11/1959   Australia _____ 252—156

LEON D. ROSDOL, Primary Examiner

E. L. ROLLINS, Assistant Examiner

U.S. Cl. X.R.

252—136, 156, 527